United States Patent [19]
Maupin et al.

[11] Patent Number: 5,712,900
[45] Date of Patent: Jan. 27, 1998

[54] EMERGENCY CALL BACK FOR ROAMING MOBILE SUBSCRIBERS

[75] Inventors: Alain Guy Maupin, Richardson; Vladimir Alperovich, Dallas, both of Tex.

[73] Assignee: Ericsson, Inc., Research Triangle Park, N.C.

[21] Appl. No.: 655,349

[22] Filed: May 21, 1996

[51] Int. Cl.$^6$ .......................... H04M 11/00; H04M 11/04
[52] U.S. Cl. .................... 379/59; 379/58; 379/60; 379/45
[58] Field of Search .................. 379/58, 59, 114, 379/45, 46, 49, 60, 61, 63; 395/650; 455/33.1, 33.2, 33.4

[56] References Cited

U.S. PATENT DOCUMENTS

| | | | |
|---|---|---|---|
| 4,924,491 | 5/1990 | Compton et al. | 379/37 |
| 4,979,204 | 12/1990 | Oyama | 379/46 |
| 5,142,654 | 8/1992 | Sonberg et al. | 379/60 |
| 5,161,180 | 11/1992 | Chavous | 379/45 |
| 5,245,651 | 9/1993 | Takashima et al. | 379/96 |
| 5,311,574 | 5/1994 | Livanos | 379/88 |
| 5,339,351 | 8/1994 | Hoskinson et al. | 379/45 |
| 5,347,568 | 9/1994 | Moody et al. | 379/45 |
| 5,388,145 | 2/1995 | Mulrow et al. | 379/45 |
| 5,414,750 | 5/1995 | Bhagat et al. | 379/58 |
| 5,430,790 | 7/1995 | Williams | 379/60 |
| 5,438,616 | 8/1995 | Peoples | 379/201 |
| 5,440,614 | 8/1995 | Sonberg et al. | 379/59 |
| 5,452,353 | 9/1995 | Menezes | 379/355 |
| 5,475,745 | 12/1995 | Boyle | 379/201 |
| 5,479,478 | 12/1995 | Fath | 379/58 |
| 5,479,482 | 12/1995 | Grimes | 379/59 |
| 5,481,603 | 1/1996 | Gutierrez et al. | 379/221 |
| 5,490,203 | 2/1996 | Jain et al. | 379/59 |
| 5,519,760 | 5/1996 | Borkowski et al. | 379/59 |
| 5,537,594 | 7/1996 | Shannon et al. | 395/650 |
| 5,557,664 | 9/1996 | Burns et al. | 379/114 |

*Primary Examiner*—Curtis Kuntz
*Assistant Examiner*—Binh K. Tieu
*Attorney, Agent, or Firm*—Jenkens & Gilchrist

[57] ABSTRACT

Whenever a mobile station originates an emergency call connection towards a Public Safety Answering Point (PSAP), a first mobile switching center (MSC) serving the mobile station assigns a first temporary local directory number (TLDN) to the call connection. The assigned TLDN is also utilized as the calling party number (CgPn). Subsequently, whenever the mobile station roams out of the first MSC coverage area, the data correlating the first TLDN with the Mobile Station Integrated Service Digital Network (MSISDN) number associated with the roaming mobile station are maintained by the first MSC if a timer assigned to the first TLDN has not expired. Alternatively, the first MSC may also communicate with the second MSC newly serving the mobile station to request and receive a second TLDN associated with the second MSC. Whenever the PSAP requests a call back connection in response to a disconnection of the original emergency call connection, the first MSC forwards the received call setup signal using the stored MSISDN or second TLDN as the new Called Party Number (CdPn).

28 Claims, 7 Drawing Sheets

EMERGENCY CALL BACK FOR ROAMING MOBILE SUBSCRIBERS

CROSS REFERENCE TO RELATED APPLICATION

This application is related to U.S. application for patent Ser. No. 08/651,982, filed May 21, 1996, entitled "Emergency Call Back Using MSC Numbers" (Docket No. 27943/64).

BACKGROUND OF THE INVENTION

1. Technical Field of the Invention

The present invention relates to a mobile telecommunications network and, in particular, to a system for implementing emergency call back of a mobile subscriber from a Public Safety Answering Point (PSAP).

2. Description of Related Art

The Emergency Service Bureau (ESB) or more commonly known in the United States as 9-1-1 service provides emergency assistance to a person in dire need of help. A mobile subscriber seeking emergency service merely has to dial a short unique number (such as 911 in the U.S.) to establish a fast emergency call connection with one of the Public Safety Answering Point (PSAP) terminals providing the ESB service. While establishing the emergency call connection with the PSAP terminal, the directory number associated with the mobile station is conventionally transmitted to the PSAP. The transmitted directory number or Mobile Station Integrated Service Digital Network number (MSISDN number, also known as Personal Station Integrated Service Directory Number—PSISDN) is utilized by the PSAP to identify the caller and is also available, if needed, to call back the mobile subscriber if the connection is disconnected.

It is desirable to re-establish the call connection as quickly as possible when calling back a mobile station in need. However, by utilizing the received MSISDN number to effectuate mobile station call back, a setup request signal has to be routed to the Gateway Mobile Switching Center (GMSC) associated with the destination Public Land Mobile Network (PLMN), the home location register (HLR) storing subscriber information related to the mobile station has to be interrogated, and the setup request signal has to be rerouted to the particular mobile switching center (MSC) currently serving the mobile station. Such complex interrogation and rerouting procedures delay the call setup and hinder the ESB from providing prompt and effective assistance to the mobile station in need. Furthermore, the call back may be charged as a long distance call to the mobile subscriber if the mobile station is currently being served by a visited PLMN.

With the development of the Personal Communications System (PCS) and the Global System for Mobile (GSM) communications, the concept of temporary local directory number (TLDN) has been introduced to alleviate the above problems. Each MSC and visitor location register (VLR, usually co-located with the MSC and collectively referred to as an MSC/VLR) contains a list of temporary local directory numbers. Each TLDN is a wireline directory number representing that particular MSC/VLR. Whenever an emergency call setup request is received from a mobile station, the next available TLDN from the list is selected for that particular mobile station and transmitted to the PSAP as the Calling Party Number (CgPn). In case the PSAP wishes to establish a call back connection with the mobile station, the received TLDN is used as the Called Party Number (CdPn).

Since the received TLDN is a wireline directory number assigned to the serving MSC, no mobile system interrogation of the home HLR or rerouting of the setup message has to be performed. Instead, the call connection is established directly between the PSAP and the serving MSC. Once the call back connection request is received by the serving MSC, the serving MSC/VLR determines the MSISDN correlated with this particular TLDN and establishes a call connection with the appropriate mobile station. Furthermore, since the serving PSAP and the serving MSC/VLR are usually located within the same PLMN, long distance charges are not incurred for the call back connection.

Even though the above TLDN solution alleviates some of the emergency call back problems, there still exist certain system limitations. In case the mobile station travels out of the first MSC/VLR coverage area and roams into a second MSC/VLR coverage area, the first MSC/VLR, pursuant to the home HLR's request, de-registers the mobile subscriber by removing all relevant subscriber information pertaining to the mobile subscriber from its database. The second MSC/VLR instead communicates with the home HLR to register the relevant subscriber information associated with the roaming emergency mobile station. However, in response to a disconnection of the emergency call connection, if the PSAP initiates an emergency call back towards the mobile station using the previously received TLDN representing the first MSC/VLR, the call back connection fails. Since the first MSC/VLR no longer retains subscriber information associated with the roaming mobile subscriber, the establishment of the emergency call back connection with the mobile station by the first MSC/VLR is no longer possible.

Accordingly, there is a need for a mechanism to enable a PSAP terminal to call back the original mobile station who has traveled out of a first MSC/VLR coverage area and roamed into a second MSC/VLR coverage area.

SUMMARY OF THE INVENTION

The present invention discloses a method and apparatus for calling back a mobile subscriber by a Public Safety Answering Point (PSAP) terminal in response to a disconnection of an initial emergency connection that existed between the mobile subscriber and the PSAP terminal. Whenever a first mobile switching center (MSC) serving a particular mobile station receives a request to originate an emergency call connection towards the PSAP, the directory number associated with the mobile station is replaced with a temporary local directory number (TLDN) assigned to the first MSC as the Calling Party Number (CgPn) in a first setup signal. The first MSC further stores data correlating the directory number representing the mobile station with the assigned TLDN. An expiration timer is also assigned to that particular TLDN. The first emergency call connection is then established between the mobile station and the PSAP.

Responsive to a determination that the first MSC needs to de-register the mobile station from its database as a result of that mobile station roaming into another geographic area being served by a second MSC, the first MSC determines the status of the assigned timer. If the timer has not yet expired, the first MSC retains the data correlating the directory number with the assigned TLDN. Subsequently, if the first MSC, in response to a disconnection of the first emergency call connection, receives a request to establish an emergency call back connection from the PSAP terminal utilizing the assigned TLDN as the Called Party Number (CdPn), the first MSC retrieves the stored directory number correlated with the received TLDN. The first MSC then forwards the call back request using the retrieved directory number as the Called Party Number (CdPn). A call back connection is then established between the PSAP and the roaming mobile station.

In another embodiment, whenever the mobile station travels into a second MSC coverage area, the first MSC requests and receives a second TLDN from the second MSC. The second TLDN is also a wireline directory number representing the second MSC. Subsequently, when the emergency call back request is received from the PSAP terminal, the first MSC retrieves the second TLDN correlated with the received CdPn. The retrieved second TLDN is then used as the Called Party Number to directly forward the request from the first MSC to the second MSC. The second MSC then establishes a call back connection with the mobile station currently roaming in its coverage area.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
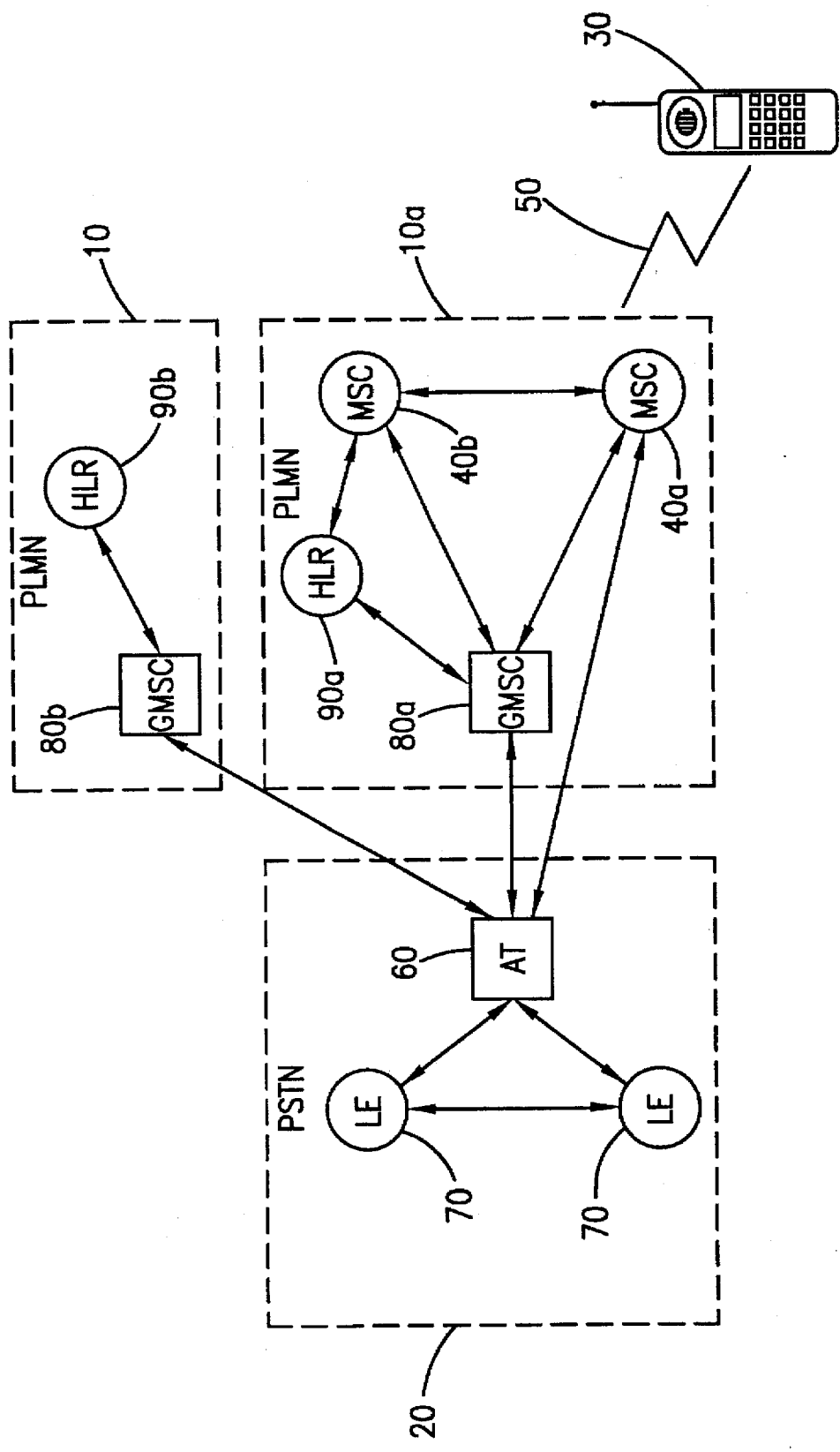
FIG. 1 is a block diagram illustrating the network interconnection of multiple Public Land Mobile Networks (PLMN) to a Public Switched Telephone Network (PSTN)

FIG. 1 is a block diagram illustrating the network interconnection of multiple Public Land Mobile Networks (PLMN) 10a–10b to a Public Switched Telephone Network (PSTN) 20. A mobile station 30 (also known as a mobile terminal or equipment) is associated with one of the PLMNs 10a as the home PLMN. Within each PLMN 10, e.g., 10a, there are a number of different mobile switching centers (MSC, usually co-located with a visitor location register (VLR) and collectively referred to as an MSC/VLR) 40a–40b servicing the geographic area covered by the network. Each MSC/VLR 40 communicates with the mobile station 30 via a radio channel 50.

Within each PLMN 10, e.g., 10a, there exists a Gateway Mobile Switching Center (GMSC) 80a for routing incoming calls intended for the mobile station 30 to the appropriate MSC/VLR 40a. As an illustration, if the PLMN 10a is the home PLMN for the mobile station 30, a call initiated by one of the local exchanges (LE) 70 within the PSTN 20 is first routed to the GSMC 80a via the access tandem (AT) 60. The GSMC 80a then sends a signal requesting routing information to the home location register (HLR) 90a serving the mobile station 30 (this step is hereinafter referred to as HLR interrogation). The HLR 90a (which stores subscriber information and keeps track of the current location of the mobile station 30) returns a routing instruction back to the GMSC 80a. The returned routing instruction includes a network address indicating which MSC/VLR 40 is currently serving the mobile station 30. Upon receipt of such routing information, the GMSC 80a transmits the incoming call to the indicated MSC/VLR 40a. The serving MSC/VLR 40a then establishes a call connection over the radio link 50 with the mobile station 30 located within its MSC/VLR serving area.

Such HLR interrogation by the GMSC 80a is necessary because the mobile station 30 is not tied to a fixed line or geographic location. Because the mobile station 30 can travel freely into any one of the MSC/VLR areas within a given PLMN 10, the MSC/VLR 40 serving the mobile station does not stay constant,. Whenever the mobile station 30 travels into a different MSC/VLR coverage area, or the unit is turned on for the first time, the serving MSC/VLR 40 performs a location update process with the home HLR 90 to inform the home HLR 90 of the mobile station's current location. As a result, the home HLR 90 maintains the location information regarding the mobile station 30 regardless of which MSC/VLR 40 is currently serving the mobile station 30. Subsequently, whenever the GMSC 80a interrogates the home HLR 90, the home HLR 90 is able to provide the network address of the MSC/VLR 40 currently serving the mobile station 30. Utilizing such location information received from the home HLR 90, the GSMC 80a routes the incoming call to the specified MSC/VLR 40.

Figure 2:
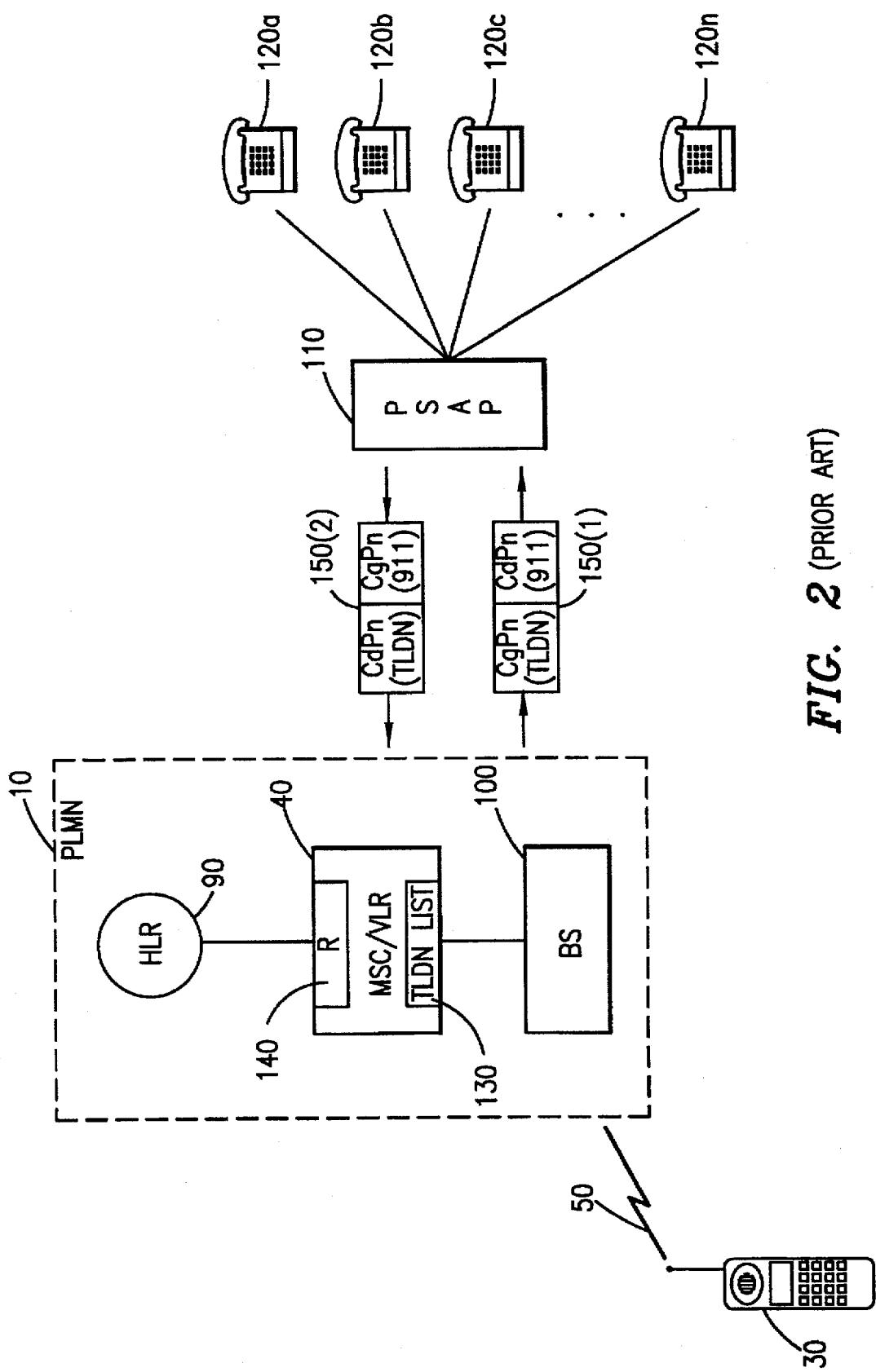
FIG. 2 is a block diagram illustrating the establishment of an emergency call connection between a mobile station and a Public Safety Answering Point (PSAP) terminal.

FIG. 2 is a block diagram illustrating the establishment of an emergency call connection between the mobile station 30 and a Public Safety Answering Point (PSAP) 110. The Emergency Service Bureau (ESB) or more commonly known in the United States as 9-1-1 service provides emergency service to a person in need of help. In order to minimize human effort, a mobile subscriber seeking emergency service merely has to dial a short unique number (such as 911 in the U.S.) to request an emergency call connection with one of the Public Safety Answering Point (PSAP) terminals 120a–120n providing the ESB service. A signal requesting an emergency call connection, such as an emergency call setup signal based on Direct Transfer Application Protocol (DTAP), is transmitted by the mobile station 30 over a dedicated channel of the radio link 50. The MSC/VLR 40 within the serving PLMN 10 receives the transmitted emergency call setup signal via a base station (BS) 100. The serving MSC/VLR 40 then determines that this is a request for an emergency call connection and transmits a network setup request signal 150, such as an Initial Address Message (IAM), towards the PSAP 110. The PSAP 110 receives the setup request signal 150 and establishes a connection between the mobile station 30 and one of the available PSAP terminals 120a–120n.

The transmitted IAM signal 150 includes Calling Party Number (CgPn) and Called Party Number (CdPn) parameters. The CdPn parameter is analyzed by the telecommunications network to determine the intended destination node for the transmitted signal, and the CgPn parameter is later utilized by the destination node to call back or return a signal back to the originating node. As an illustration, the CgPn parameter for the first IAM message 150(1) transmitted from the MSC/VLR 40 towards the PSAP 110 contains the MSISDN value assigned to the mobile station 30. Utilizing the first IAM message 150(1), a first call connection between the mobile station 30 and one of the PSAP terminals 120 connected to the PSAP 110 is established. In case the first call connection between the PSAP terminal 120 and the mobile station 30 is disconnected, the PSAP 110 initiates a call back request to establish a call connection with the mobile station 30 by transmitting a second IAM signal 150(2). The received MSISDN value in the CgPn parameter of the first IAM signal 150(1) is utilized as the CdPn for the second IAM signal 150(2). Since the received MSISDN number is a mobile directory number, in order to establish a call connection with the mobile station 30, the interrogation of the home HLR 90 and the rerouting of the call setup message by the GMSC 80a (not shown in FIG. 2) need to be performed in a manner described in FIG. 1. However, such mobile call setup procedures delaying the call connection between the PSAP 110 and the mobile station 30 is undesirable while establishing an emergency call connection.

With the development of the PCS, the concept of temporary local directory number (TLDN) has been introduced to somewhat alleviate the above problem. Whenever the serving MSC/VLR 40 receives an emergency call setup signal from the mobile station 30, the next available wireline directory number from the TLDN list 130 is selected for that particular mobile station 30. A timer which is preset for a predetermined period of time is also assigned to that particular TLDN. For example, a timer for fourty-five minutes is assigned to that particular TLDN. The register (R) 140 within the serving MSC/VLR 40 further correlates the selected TLDN with the MSISDN associated with the mobile station 30. The selected TLDN is then transmitted as the CgPn towards the PSAP 110 when transmitting the first IAM signal 150(1) to establish a first emergency call connection between the mobile station 30 and the PSAP terminal 120. The assigned TLDN and the correlated MSISDN are maintained by the serving MSC/VLR 40 until the assigned timer expires. After the timer expires, the assigned TLDN is released and made available for use by other emergency call connections.

In case the first emergency call connection is disconnected between the two parties and the PSAP 110 wants to call back the mobile station 30, the received TLDN is transmitted as the CdPn for the second IAM signal 150(2). After receiving the second IAM signal 150(2), if the timer has not yet expired, the serving MSC/VLR 40 retrieves the MSISDN correlated with the received TLDN from the register (R) 140 and establishes a call back connection with the mobile station 30. Accordingly, by utilizing the received TLDN representing a wireline address, the above mentioned incoming mobile call setup procedures can be avoided and the new call connection between the two parties directly established.

Figure 3:
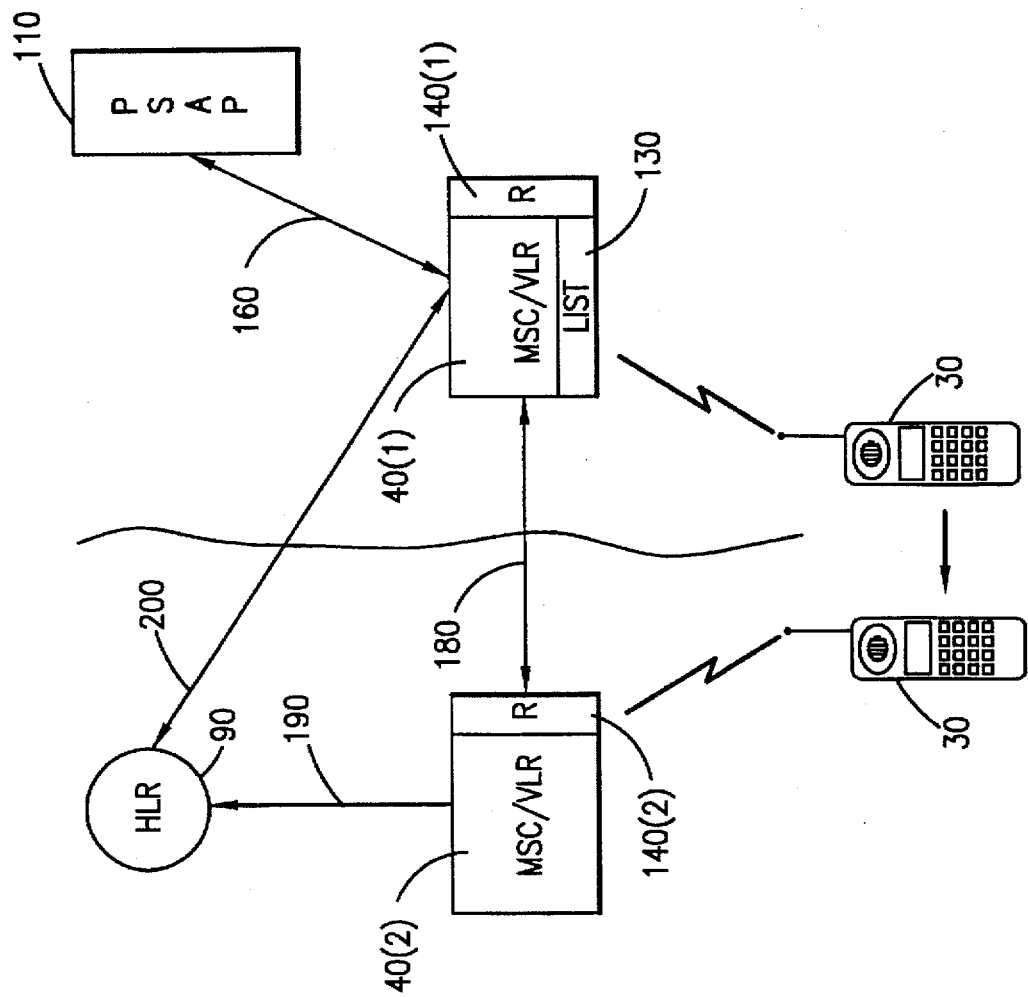
FIG. 3 is a block diagram illustrating the roaming of a mobile station from a first mobile switching center (MSC) to a second MSC.

Even though the above TLDN solution alleviates the delays mandated by the handling of incoming calls within a mobile telecommunications system, there still exists certain undesirable system limitations. Reference is now made to FIG. 3 illustrating the roaming of the mobile station 30 from a first MSC/VLR 40(1) to a second MSC/VLR 40(2). The mobile station 30 initiates an emergency call connection 160 while being served by the first MSC/VLR 40(1). The call connection 160 from the mobile station 30 to the PSAP 110 is established using a TLDN associated with that particular MSC/VLR 40(1) as the CgPn. If the mobile station 30 later roams into another geographic area being served by the second MSC/VLR 40(2), the first MSC/VLR 40(1) hands over the call connection 160 to the second MSC/VLR 40(2) as illustrated by a signal link 180. After successfully handing over the call connection to the second MSC/VLR 40(2), the speech connection is established between the mobile station 30 and the PSAP 110 via the call connections 180 and 160. The first MSC/VLR 40(1) remains in the call connection as an "anchor switch" and connects the second MSC/VLR 40(2) with the PSAP 110. If the mobile station 30 subsequently goes onhook, the call connections 180 and 160 are disconnected. The second MSC/VLR 40(2) then performs a location update with the home HLR 90 to inform the home HLR 90 with the latest location of the mobile station 30. The home HLR 90 updates its data to reflect the changes in the mobile station's location and also provides requisite information to the new MSC/VLR 40(2). The home HLR 90 further instructs the first MSC/VLR 40(1) to deregister the subscriber record pertaining to the mobile station 30 by transmitting the Cancel_Location signal. Thereinafter, the first MSC/VLR 40(1) no longer provides mobile service to the mobile station 30 unless the mobile station 30 roams back into the first MSC/VLR coverage area.

However, in response to a disconnection of the emergency call connection 160, if the PSAP 110 attempts to call back the mobile station 30 using the received TLDN as the CdPn, the call back attempt fails. The received TLDN by the PSAP is a wireline directory number representing the first MSC/VLR 40(1). If a call back setup request signal with that particular TLDN as the CdPn is transmitted, the call setup request signal is routed to the first MSC/VLR 40(1) as indicated by the CdPn. Since the mobile station 30 has roamed out of the first MSC/VLR coverage area and the first MSC/VLR 40(1) has already removed all subscriber information pertaining to the mobile station 30 from its database, the first MSC/VLR 40(1) is unable to process the received call back setup request. Furthermore, since the PSAP 110 is not aware of the MSISDN associated with the roaming mobile station 30, the PSAP 110 is also not able to call back the mobile station 30 directly.

As another illustration of the system limitations imposed by the conventional TLDN implementation, the mobile station 30 originates and terminates the emergency call connection 160 with the PSAP 110. Even after the termination of the emergency call connection, the first MSC/VLR maintains the data correlating the previously assigned TLDN with the MSISDN associated with the mobile station 30 until the timer expires. Before the timer expires, the mobile station 30 roams into the second MSC/VLR coverage area in idle mode. The second MSC/VLR 40(2) detects the presence of the roaming mobile station 30 within its coverage area and accordingly updates the home location register 90 serving the mobile station 30 as illustrated by a signal link 190. After receiving the new MSC/VLR address and the mobile station location from the second MSC/VLR 40(2), the home HLR 90 informs the first MSC/VLR 40(1) to de-register the mobile station 30 as illustrated by a signal link 200. As a result, the first MSC/VLR 40(1) deletes all subscriber information associated with the mobile station 30 from its database including the TLDN correlation data stored in the register (R) 140(1). Thereinafter, in a manner described above, if the PSAP 110 requests a call back connection with the mobile station 30 to the first MSC/VLR 40(1), before the assigned timer expires, the first MSC/VLR 40(1) is not able to process the request.

Accordingly, there is a need for a mechanism to enable the PSAP to call back a roaming mobile station who has traveled out of the original MSC/VLR coverage area and roamed into a different MSC/VLR coverage area.

Figure 4:
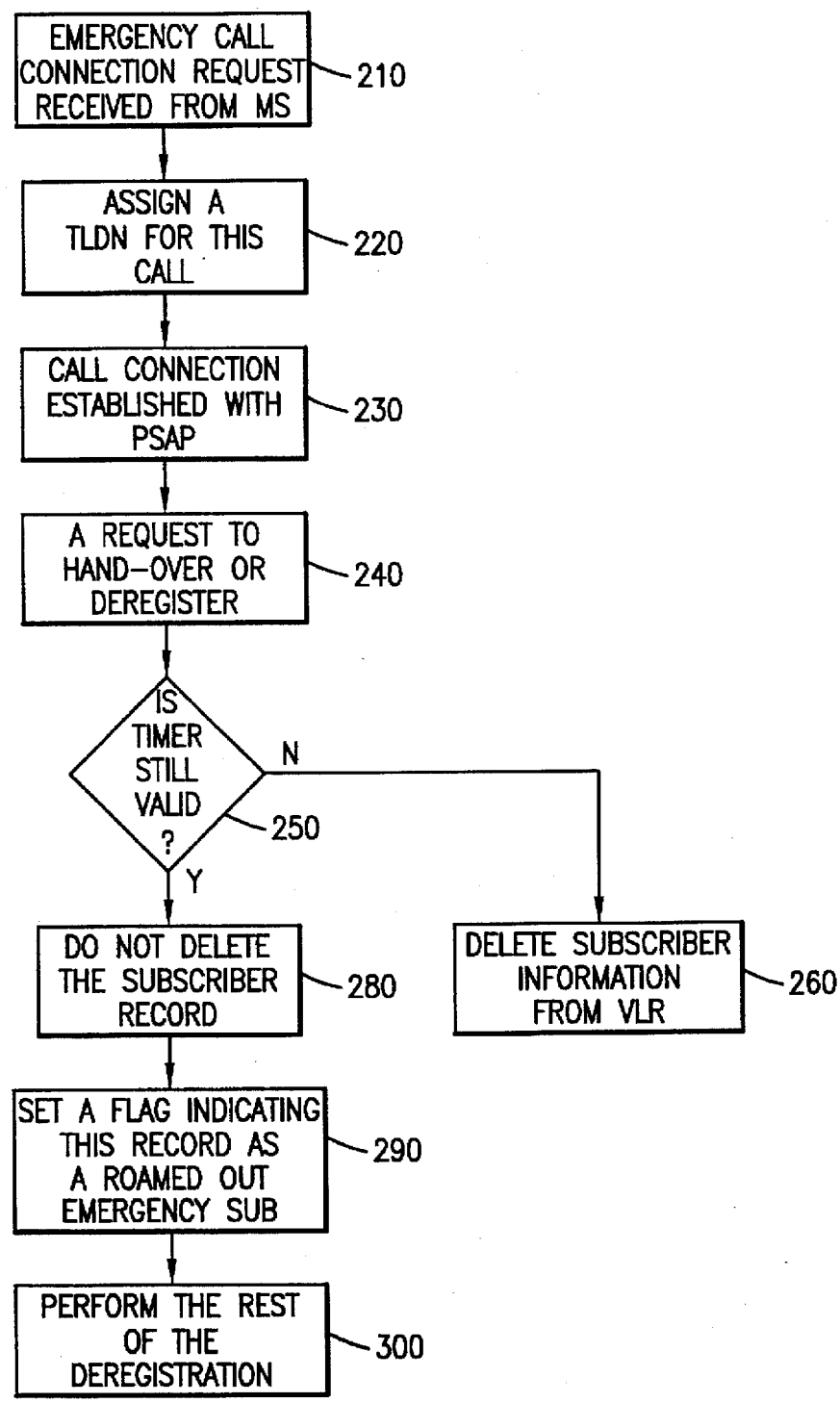
FIG. 4 is a flowchart enumerating the steps taken by the serving MSC for enabling the PSAP terminal to call back the roaming mobile station in accordance with the teachings of the present invention.

FIG. 4 is a flowchart enumerating the steps taken by the serving MSC for enabling the PSAP terminal to call back the roaming mobile station in accordance with the teachings of the present invention. The first MSC/VLR receives an emergency call connection request from the mobile station (step 210). In order to facilitate a direct call back in case the original call connection is disconnected, the first MSC/VLR retrieves the next available TLDN from its TLDN list (step 220) and transmits the retrieved TLDN as the Calling Party Number (CgPn) in its setup signal. Such a setup signal includes an Initial Address Message (IAM) transmitted over an Integrated Services Digital Network User Part (ISUP) signal link to request a call connection. A timer for a predetermined period of time is also assigned to the retrieved TLDN at this time. Since each MSC/VLR contains a limited number of TLDNs, the purpose of assigning a timer to a TLDN is to release the assigned TLDN after the timer expires and to enable a subsequent emergency call to utilize the same number.

As a result, the emergency call connection between the mobile station and the PSAP is established at step 230. Subsequently, the first MSC/VLR determines that the subscriber information pertaining to the mobile station needs to be deleted from its database (step 240). As described in FIG. 3, such a determination is made whenever the mobile station roams out of the first MSC/VLR coverage area and roams into a second MSC/VLR area. If the mobile station roams into the second MSC/VLR area in idle mode, the home location register associated with the mobile station instructs the first MSC/VLR to de-register the mobile station by transmitting a Cancel Location signal. If the mobile station roams into the second MSC/VLR area in busy mode (in speech connection with the PSAP), the home HLR instructs the first MSC/VLR to de-register the mobile station as soon as the existing call connection is disconnected and a new location update is performed by the second MSC/VLR. The first MSC/VLR then determines whether the timer assigned to the particular TLDN correlated with the mobile station has expired (step 250). In response to a determination that the timer has expired, the first MSC/VLR removes the subscriber information from its database and de-registers the mobile station (260).

On the other hand, if the assigned timer is still valid, the first MSC/VLR retains the data correlating the assigned TLDN with the MSISDN associated with the roaming mobile station (step 280). A flag variable within the register (R) is further set to indicate that the mobile station associated with this MSISDN has moved out of the first MSC/VLR coverage area (step 290). All other subscriber information pertaining to the mobile station, however, can be deleted from its database. The rest of the de-registration procedure is performed in a conventional manner at step 300. By not deleting the data correlating the MSISDN number associated with the assigned TLDN from the register (R), the first MSC/VLR is later able to process a call back connection request received from the PSAP.

Figure 5:
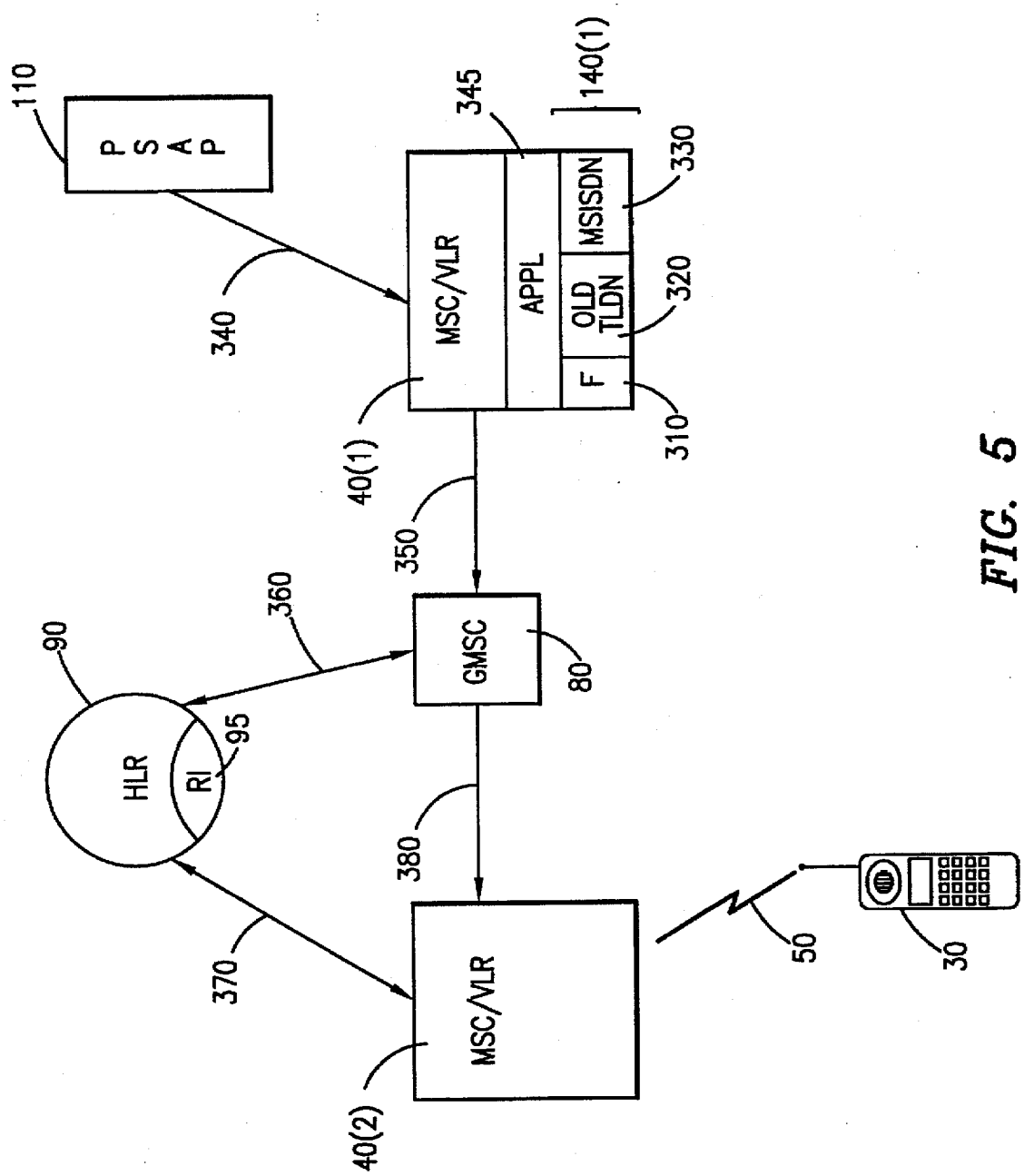
FIG. 5 is a block diagram illustrating the establishment of a call back connection between the PSAP terminal and the roaming mobile station using a stored Mobile Station Integrated Service Digital Network (MSISDN) number.

Accordingly, FIG. 5 is a block diagram illustrating the establishment of a call back connection between the PSAP terminal 110 and the roaming mobile station 30 using the maintained correlation data as described in FIG. 4. The PSAP 110, in response to a disconnection of the original call connection, requests a call back connection with the mobile station 30 using the previously received TLDN as the CdPn. Since the received TLDN represents a wireline directory number for the first MSC/VLR 40(1), the request for call back connection is accordingly routed to the first MSC/VLR 40(1). Even though the first MSC/VLR 40(1) no longer provides mobile service to the mobile station 30, as a result of the procedures described in FIG. 4, the first MSC/VLR 40(1) still retains the data correlating the received TLDN with the MSISDN associated with the mobile station 30. Therefore, an application module 345 retrieves the flag variable (F) 310 from the register (R) 140(1) to determine that the mobile station associated with the stored MSISDN 330 has roamed out of the first MSC/VLR coverage area. The first MSC/VLR 40(1) then forwards the received request, such as an IAM, utilizing the retrieved MSISDN as the new CdPn. Since the indicated MSISDN is a mobile number uniquely representing the mobile station 30, the request signal is first routed to the GMSC associated with the home HLR 90 (signal link 350). The GMSC 80a then interrogates the home HLR 90 for routing information (Signal link 360). The home HLR 90, by retrieving the latest subscriber location information from its register 1 (R1) 95, further request a roaming number from the second MSC/VLR. 40(2) currently serving the mobile station 30 (signal link 370). The second MSC/VLR 40(2) provides the roaming number back to the home HLR 90. The home HLR 90 further returns the roaming number back to the GMSC 80a. Utilizing the received roaming number indicating the network address of the second MSC/VLR 40(2), the request signal for establishing a call back connection is routed from the GMSC 80a to the second MSC/VLR 40(2) (signal link 380). The second MSC/VLR 40(2) then provides the call back connection with the PSAP 110 by establishing the radio link 50 with the mobile station 30 roaming within its coverage area. As a result, even though the first MSC/VLR 40(1), which no longer serves the mobile station 30, received the request for a call back connection, by retaining the relevant information and forwarding the request to the second MSC/VLR, the call back connection is established between the PSAP 110 and the mobile station 30.

Figure 6:
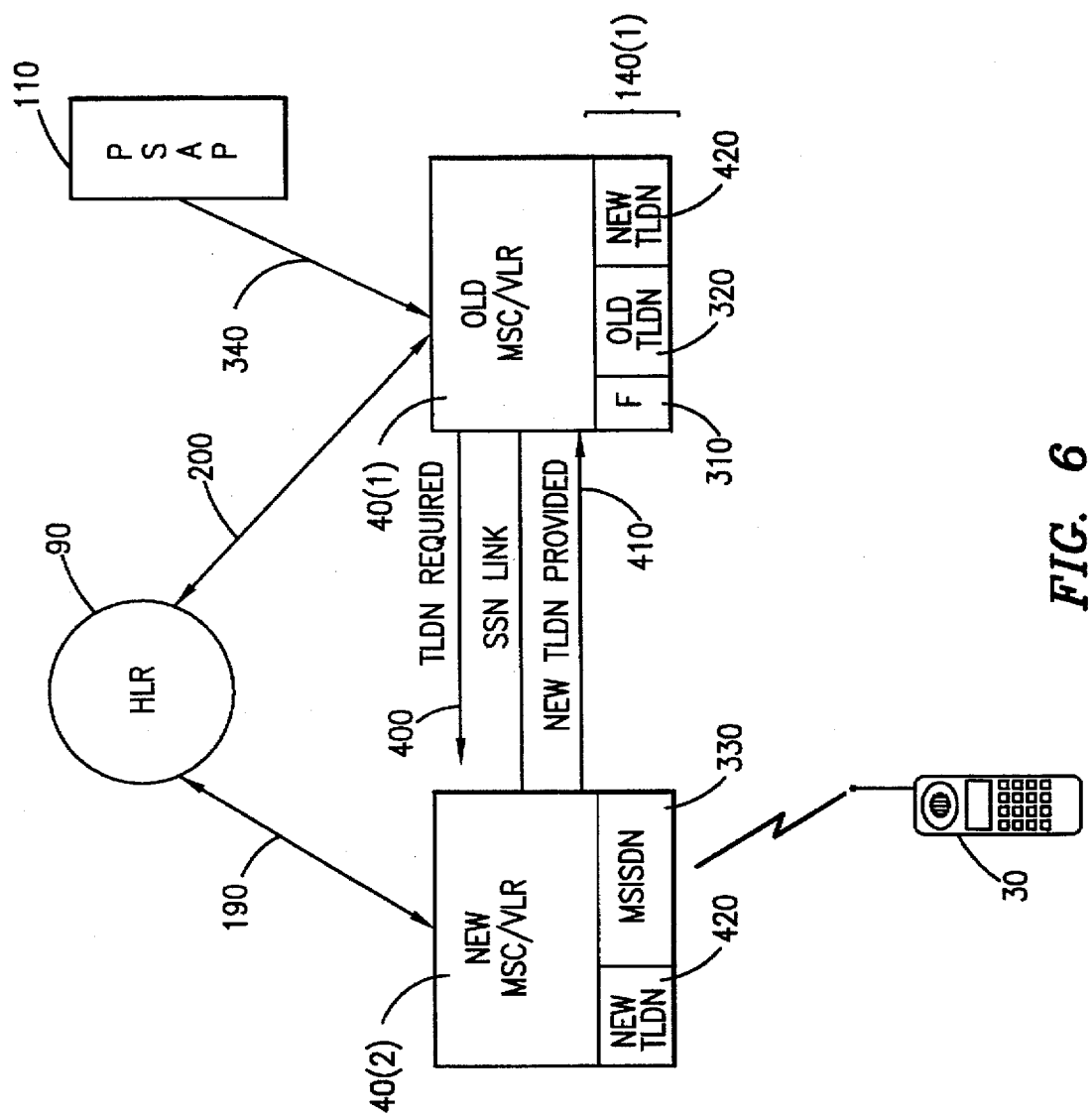
FIG. 6 is a block diagram illustrating the communication of a new Temporary Local Directory Number (TLDN) from the second MSC to the first MSC.

As another embodiment of the present invention, FIG. 6 illustrates the communication of a new TLDN from the second MSC/VLR 40(2) receiving the roaming mobile station 30 to the first MSC/VLR 40(1) transferring the roaming mobile station 30. While engaging in a call connection with the PSAP 110, if the mobile station 30 travels out of the first MSC/VLR coverage area and into the second MSC/VLR coverage area, one of the base station controllers (BSC, not shown) associated with the first MSC/VLR 40(1) sends a Handover Required message to the first MSC/VLR together with the identity of the target cell. The first MSC/VLR determines that the target cell belongs to the second MSC/VLR 40(2) and requests handover of the call connection to the second MSC/VLR 40(2). While requesting handover to the second MSC/VLR 40(2), in accordance with the teachings of the present invention, the first MSC/VLR 40(1) further requests one of the TLDNs associated with the second MSC/VLR 40(2) (signal link 400). In response to such a request, the second MSC/VLR 40(2) retrieves the next available TLDN from its TLDN list and sends it back to the first MSC/VLR 40(1) (signal link 410). Such communications can be accomplished by utilizing the existing handover signals (Prepare_Handover and Prepare_HandoverAck), or by introducing new Mobile Application Part (MAP) based signals. The second MSC/VLR 40(2) further stores data correlating the transmitted TLDN 420 with the MSISDN 330 associated with the roaming mobile station 30. After receiving the new TLDN from the second MSC/VLR 40(2), the first MSC/VLR 40(1) updates the correlation data in the register (R) 140(1) to correlate the received TLDN with the previously assigned TLDN associated with the first MSC/VLR 40(1). As a result, the MSISDN stored in the register (R) 140(1) is effectively overwritten with the received TLDN associated with the second MSC/VLR 40(2) The flag variable 310 within the register (R) 140(1) is also updated to indicate that the mobile station associated with the stored MSISDN has roamed out of the first MSC/VLR service area.

As another illustration of de-registration of the mobile station 30 by the first MSC/VLR 40(1), the mobile station 30 roams into the second MSC/VLR area in idle mode after the disconnection of the original call connection with the PSAP 110 (including turning on the mobile station for the first time in the second MSC/VLR area after leaving the first MSC/VLR area). The second MSC/VLR 40(2) detects the mobile station's presence and requests from the first MSC/VLR 40(1), during the mobile station's authentication procedure, certain necessary system parameters. In a return signal 400, in accordance with the teachings of the present invention, the first MSC/VLR 40(1) places an indication requesting the second MSC/VLR 40(2) to assign and transmit a new TLDN back to the first MSC/VLR 40(1). The second MSC/VLR 40(2) retrieves, in accordance with the indication included in the return signal, the next available TLDN, stores the retrieved TLDN 420 with the MSISDN number 330 in its register, and transmits the retrieved TLDN to the first MSC/VLR 40(1) via another MAP signal 410. Upon receipt of the new TLDN, the first MSC/VLR 40(1) updates the correlation data to correlate the newly received TLDN with the previously assigned TLDN. The second MSC/VLR 40(2) then performs a location update with the home HLR 90 associated with the mobile station 30 (signal link 190). After providing the requisite subscriber information to the second MSC/VLR 40(2), the home HLR 90 informs the first MSC/VLR 40(1) to de-register the roamed out mobile station 30 from its database using a MAP signal such as Cancel Location in a manner described above. Because the assigned timer is still valid, the first MSC/VLR 40(1) retains the subscriber record along with the newly received TLDN.

Consequently, whenever the mobile station 30 leaves the first MSC/VLR coverage area before the assigned timer expires, the first MSC/VLR 40(1) maintains a TLDN representing the second MSC/VLR 40(2) in the register (R) 140(1).

Figure 7:
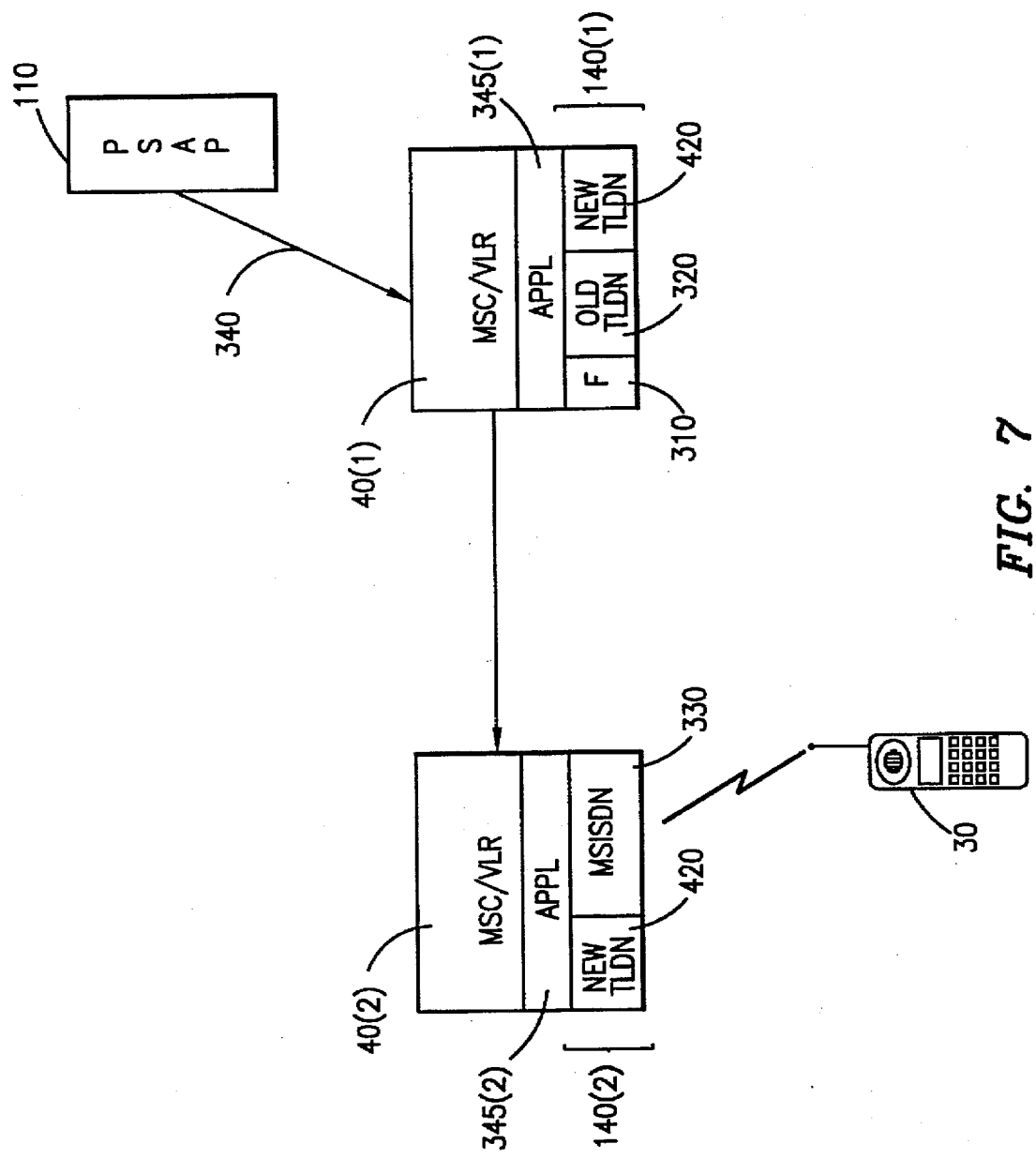
FIG. 7 is a block diagram illustrating the call forwarding of a call back request from the first MSC to the second MSC using the received TLDN as the Called Party Number.

FIG. 7 is a block diagram illustrating the call forwarding of a call back request from the first MSC/VLR 40(1) to the second MSC/VLR 40(2) while utilizing the stored second TLDN as the CdPn. Whenever the PSAP 110 requests a call back connection with the mobile station 30 in response to a disconnection of the original call connection, the previously received CgPn parameter is utilized as the CdPn parameter for the call back request signal. Because the received CgPn includes the TLDN associated with the first MSC/VLR 40(1), the call back request signal, such as an IAM, is routed to the first MSC/VLR 40(1). Even though the mobile station 30 is no longer being served by the first MSC/VLR 40(1), in accordance with the teachings of the present invention, the first MSC/VLR 40(1) retains the data correlating the received TLDN with the new TLDN associated with the second MSC/VLR 40(2). The application module 345(1) within the first MSC/VLR 40(1) determines that the mobile station 30 associated with the received TLDN is no longer within the first MSC/VLR coverage area by evaluating the flag variable 310. The application module 345(1) then retrieves the new TLDN 420 associated with the received TLDN 320 from its register (R) 140(1) and forwards the IAM signal using the retrieved TLDN 420 as the new CdPn. Since the new TLDN 420 represents a wireline directory number associated with the second MSC/VLR 40(2), the call back request signal is directly routed from the first MSC/VLR 40(1) to the second MSC/VLR 40(2) without performing the mobile call routing procedures, (i.e., HLR interrogation). After the rerouted IAM signal is received by the second MSC/VLR 40(2), the application module 345(2) within the second MSC/VLR 40(2) indexes its register (R) 140(2) with the received TLDN 420 to retrieve the correlated MSISDN 330 associated with the mobile station 30. After retrieving the MSISDN 330 from its register, the second MSC/VLR 40(2) determines the exact location of the roaming mobile station 30. After alerting the mobile station 30 of an incoming call, the call back connection is accordingly established between the mobile station 30 and the PSAP 110.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for establishing a call connection between a mobile station (MS) having an identification number and a telecommunications terminal (TT), said method comprising the steps of:

receiving a first signal at a first mobile switching center (MSC), said first signal being transmitted by said MS and requesting a call connection with said TT;

assigning a first wireline directory number associated with said first MSC to said mobile station;

setting a particular timer to a preselected value and associating said particular timer with said assigned first wireline directory number;

storing first data correlating said particular timer and its associated first wireline directory number with said identification number;

establishing a call connection between said MS and said TT using said first wireline directory number as a Calling Party Number (Cgpn);

determining that said first MSC needs to deregister said MS as a result of said MS roaming into another geographic area served by a second MSC;

determining whether said preselected value set for said particular timer has expired; and maintaining said first data correlating said first wireline directory number with said identification number representing said mobile station in response to a determination that said timer has not expired.

2. The method of claim 1 wherein said TT comprises a Public Safety Answering Point (PSAP) terminal.

3. The method of claim 1 wherein said identification number comprises a Mobile Station Integrated Services Digital Network (MSISDN) number.

4. The method of claim 1 wherein said first wireline directory number comprises a Temporary Local Directory Number(TLDN).

5. The method of claim 1, responsive to a failure of said call connection between said MS and said TT, further comprising the steps of:

receiving a second signal at said first MSC, said second signal requesting a call back connection between said MS and said TT and using said first wireline directory number as a Called Party Number (CdPn);

determining said identification number associated with said first wireline directory number;

determining whether said MS associated with said determined identification number is still being served by said first MSC; and forwarding said second signal requesting said call back connection using said determined identification number as said CdPn in response to a determination that said MS is no longer being served by said first MSC; otherwise establishing said call back connection with said MS by said first MSC.

6. The method of claim 5 wherein said step of maintaining said first data further comprises the steps of:

transmitting a request for a second wireline directory number associated with said second MSC by said first MSC;

in response to a receipt of said request for said second wireline directory number:

assigning said second wireline directory number for said MS by said second MSC;

storing second data correlating said identification number with said second wireline directory number; and transmitting said assigned second wireline directory number back to said first MSC; and updating said first data to correlate said first wireline directory number with said received second wireline directory number in response to a receipt of said transmitted second wireline directory number by said first MSC.

7. The method of claim 6 wherein said step of forwarding said second signal further comprises the steps of:

forwarding said second signal to said second MSC using said second wireline directory number as said CdPn;

determining said identification number correlated with said received second wireline directory number in response to a receipt of said second signal by said second MSC; and establishing said call back connection with said MS associated with said determined identification number by said second MSC.

8. The method of claim 6 wherein said second directory number comprises a Temporary Local Directory Number (TLDN).

9. The method of claim 5 wherein said second signal comprises an Initial Address Message (IAM) signal for requesting a call setup.

10. The method of claim 1 wherein said step of determining that said first MSC needs to deregister said MS includes the step of receiving a cancel location register from a home location register (HLR) serving said MS.

11. A system for establishing a call connection between a mobile station (MS) having an identification number and a telecommunications terminal (TT), said system comprising:

means for receiving a first signal at a first mobile switching center (MSC), said first signal being transmitted by said MS and requesting a call connection with said TT;

means for assigning a first wireline directory number associated with said first MSC to said mobile station;

means for setting a particular timer to a preselected value and associating said particular timer with said assigned first wireline directory number;

means for storing first data correlating said particular timer and its associated first wireline directory number with said identification number;

means for establishing a call connection between said MS and said TT using said first wireline directory number as a Calling Party Number (CgPn);

means for determining that said first MSC needs to deregister said MS as a result of said MS roaming into another geographic area served by a second MSC;

means for determining whether said preselected value set for said particular timer has expired; and means for maintaining said first data correlating said first wireline directory number with said identification number representing said mobile station in response to a determination that said timer has not expired.

12. The system of claim 11 wherein said TT comprises a Public Safety Answering Point (PSAP) terminal.

13. The system of claim 11 wherein said identification number comprises a Mobile Station Integrated Services Digital Network (MSISDN) number.

14. The system of claim 11 wherein said first wireline directory number comprises a Temporary Local Directory Number(TLDN).

15. The system of claim 11, responsive to a failure of said call connection between said MS and said TT, further comprising:

means for receiving a second signal at said first MSC, said second signal requesting a call back connection between said MS and said TT and using said first wireline directory number as a Called Party Number (CdPn);

means for determining said identification number associated with said first wireline directory number;

means for determining whether said MS associated with said determined identification number is still being served by said first MSC; and means for forwarding said second signal requesting said call back connection using said determined identification number as said CdPn in response to a determination that said MS is no longer being served by said first MSC; otherwise means for establishing said call back connection with said MS by said first MSC.

16. The system of claim 15 wherein said means for maintaining said first data further comprises:

means for requesting a second wireline directory number associated with said second MSC by said first MSC;

in response to a receipt of said request requesting said second wireline directory number:

means for assigning said second wireline directory number for said MS by said second MSC;

means for storing second data correlating said identification number with said second wireline directory number; and means for transmitting said assigned second wireline directory number back to said first MSC; and means for updating said first data to correlate said first wireline directory number with said received second wireline directory number in response to a receipt of said transmitted second wireline directory number by said first MSC.

17. The system of claim 16 wherein said means for forwarding said second signal further comprises:

means for forwarding said second signal to said second MSC using said second wireline directory number as said CdPn;

means for determining said identification number correlated with said received second wireline directory number in response to a receipt of said second signal by said second MSC; and means for establishing said call back connection with said MS associated with said determined identification number by said second MSC.

18. The system of claim 16 wherein said second wireline directory number comprises a Temporary Local Directory Number (TLDN).

19. The system of claim 15 wherein said second signal comprises an Initial Address Message (IAM) signal for requesting a call setup.

20. The system of claim 11 wherein said means for determining that said first MSC needs to deregister said MS includes means for receiving a cancel location signal from a home location register (HLR) serving said MS.

21. A method for establishing a call back connection between a mobile station (MS) and a telecommunications terminal (TT), wherein said MS initially originated a call connection with said TT using a first wireline directory number associated with a first mobile switching center (MSC) serving said MS as a Calling Party Number (CgPn), said first wireline directory number has been assigned to a timer for a certain period of expiration time by said first MSC, and wherein said first MSC further stores first data correlating said first wireline directory number and said timer with an identification number representing said MS, said method comprising the steps of:

in response to a determination that said first MSC needs to deregister said MS as a result of said MS traveling into another geographic area served by a second MSC:
  determining whether said timer correlated with said first wireline directory number associated with said MS has expired; and
  maintaining said first data correlating said first wireline directory number with said identification number representing said MS in response to a determination that said timer has not expired; and
  receiving a request by said first MSC, in response to a disconnection of said call connection, to establish a call back connection from said TT to said MS, said request using said first wireline directory number as a Called Party Number (CdPn); and forwarding said request by said first MSC using said identification number associated with said received first wireline directory number as said CdPn.

22. The method of claim 21 wherein said TT comprises a Public Safety Answering Point (PSAP) terminal.

23. The method of claim 21 wherein said identification number comprises a Mobile Station Integrated Services Digital Network (MSISDN) number.

24. The method of claim 21 wherein said first wireline directory number comprises a Temporary Local Directory Number (TLDN).

25. The method of claim 21 wherein said step of maintaining said first data further comprises the steps of:

transmitting a request for a second wireline directory number associated with said second MSC by said first MSC;

in response to a receipt of said request for said second wireline directory number by said second MSC:
  assigning said second wireline directory number for said MS by said second MSC;
  storing second data correlating said identification number with said second wireline directory number; and
  transmitting said assigned second wireline directory number back to said first MSC; and updating said first data to correlate said first wireline directory number with said received wireline second directory number in response to a receipt of said transmitted second wireline directory number by said first MSC.

26. The method of claim 25 wherein said step of
forwarding said request further comprises the steps of:
  forwarding said request to said second MSC using said second wireline directory number as said CdPn;
  determining said identification number correlated with said received second wireline directory number in response to a receipt of said request by said second MSC; and
  establishing said call back connection with said MS associated with said determined identification number.

27. The method of claim 25 wherein said second wireline directory number comprises a Temporary Local Directory Number (TLDN).

28. The method of claim 21 wherein said request comprises an Initial Address Message (IAM) signal for requesting a call setup.

* * * * *